United States Patent
Jahn et al.

(10) Patent No.: US 10,643,151 B1
(45) Date of Patent: May 5, 2020

(54) META-MODEL OBJECT COMMUNICATION AND NODE DEFINITION SYSTEM AND PROCESSES FOR PROVISIONING OBJECTS DEFINED IN A NEUTRAL DEFINITION LANGUAGE OF A NODE META-MODEL

(71) Applicants: Chris Jahn, Sparks, NV (US); Michel Kohanim, Encino, CA (US)

(72) Inventors: Chris Jahn, Sparks, NV (US); Michel Kohanim, Encino, CA (US)

(73) Assignee: UNIVERSAL DEVICES, INC, Encino, CA (US)

( * ) Notice: Subject to any disclaimer, the term of this patent is extended or adjusted under 35 U.S.C. 154(b) by 546 days.

(21) Appl. No.: 15/417,058

(22) Filed: Jan. 26, 2017

(51) Int. Cl.
*G06N 20/00* (2019.01)
*G06F 40/58* (2020.01)

(52) U.S. Cl.
CPC ............ *G06N 20/00* (2019.01); *G06F 40/58* (2020.01)

(58) Field of Classification Search
CPC .............................. G06N 20/00; G06F 17/289
See application file for complete search history.

(56) References Cited

U.S. PATENT DOCUMENTS

| | | | |
|---|---|---|---|
| 2003/0187771 A1* | 10/2003 | Bulan | G06Q 40/06 705/36 R |
| 2016/0134932 A1* | 5/2016 | Karp | H04W 4/80 348/155 |
| 2016/0328719 A1* | 11/2016 | Ananchaperumal | G06Q 30/0201 |
| 2017/0235716 A1* | 8/2017 | Arrowood | G06F 17/2288 704/8 |

* cited by examiner

*Primary Examiner* — Austin Hicks
(74) *Attorney, Agent, or Firm* — Plager Schak LLP; Mark H. Plager; Stephen Hallberg

(57) ABSTRACT

Node meta-model systems and processes are disclosed which provide a seamless run-time integration between disparate devices, objects, frameworks, and/or agents ("objects") without a priori knowledge of the types of objects, their capabilities, accepted commands/events, and underlying frameworks, and without expending any development effort. By introducing a node meta model, each system, device, and framework is described using its capabilities, properties, events, and methods of communications and thus an agent, at run-time, can figure out how to integrate/communicate with these systems accurately and without any development effort.

5 Claims, 7 Drawing Sheets

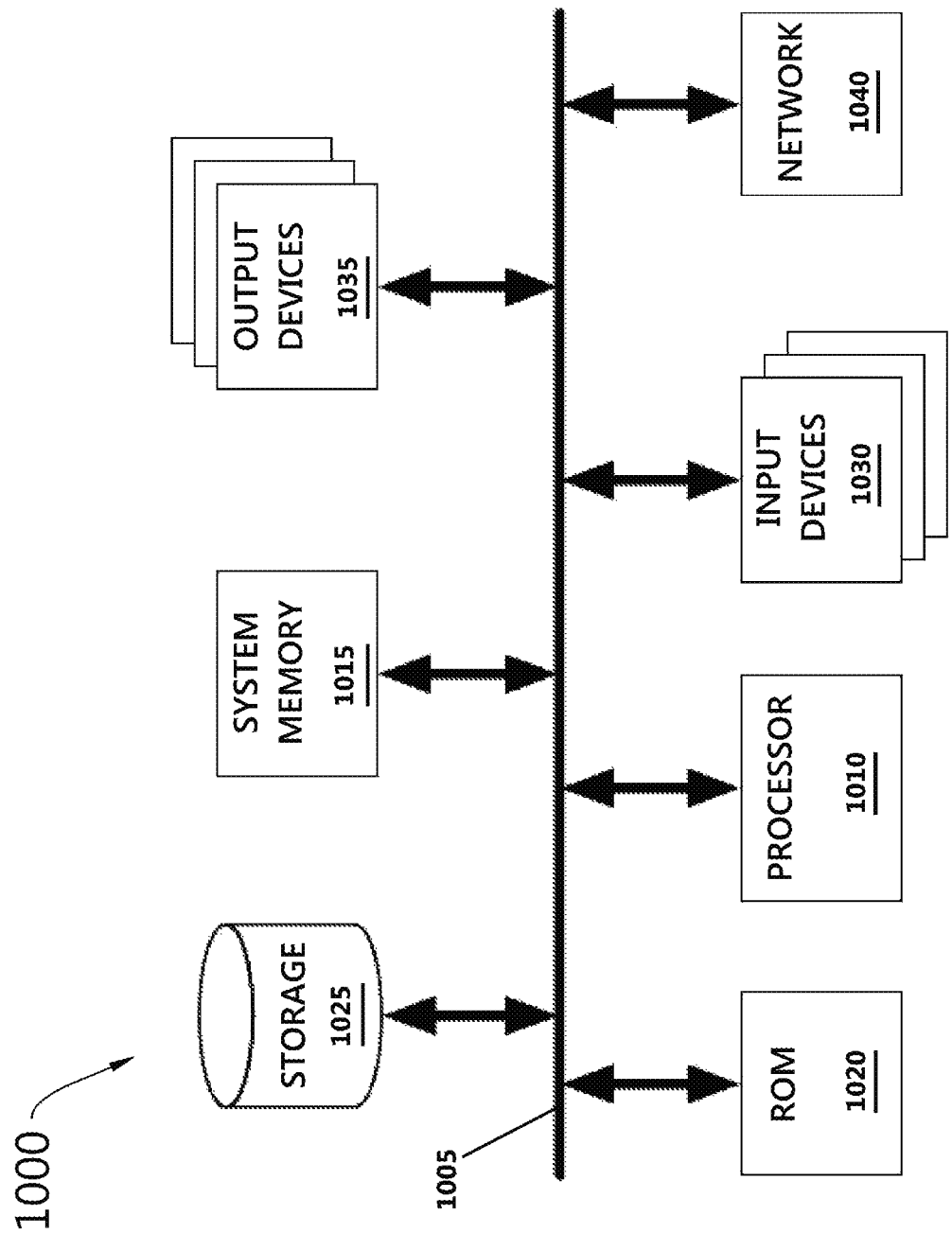

META-MODEL OBJECT COMMUNICATION AND NODE DEFINITION SYSTEM AND PROCESSES FOR PROVISIONING OBJECTS DEFINED IN A NEUTRAL DEFINITION LANGUAGE OF A NODE META-MODEL

BACKGROUND

Embodiments of the invention described in this specification relate generally to communicating with connected devices, and more particularly, to processes for provisioning objects and communicating with provisioned objects in a meta-model object communication and node definition system.

With the ever ubiquity of connected and inter-networked devices and frameworks (or rather, devices and frameworks of the "Internet of Things", hereinafter referred to by the acronym "IoT"), it has become increasingly difficult to create a seamless and run-time integration/binding between disparate devices, frameworks, and agents without a priori knowledge of the type of devices, their capabilities, accepted commands/events, and underlying frameworks. In this respect, then, any type of integration and binding requires knowledge at the time of development (or simply, "development-time" knowledge) and expertise of each type of device/framework and, therefore, is not conducive to real-time and hands-off integration.

Each IoT standard/framework lives in its own vertical silo and thus imposes strict development-time adherence to the syntax and semantics of the IoT standard/framework. In and of itself, this paradigm excludes integration between different IoT silos/standards/frameworks/things at run-time and thus each manufacturer must choose a standard/framework at development time and stick with it for the lifetime of the product.

Therefore, what is needed is a way to create a seamless and run-time integration/binding between disparate devices, frameworks, and/or agents without a priori knowledge of the types of devices, their capabilities, accepted commands/events, and underlying frameworks, and to be able to do so with no development effort.

BRIEF DESCRIPTION

Some embodiments of the invention include processes for provisioning objects and communicating with provisioned objects in a meta-model object communication and node definition system that creates—without a priori knowledge of the types of devices, their capabilities, accepted commands/events, and underlying frameworks, and without expending any development effort—a node meta model that provides a seamless run-time integration (or "binding") between disparate devices, objects, frameworks, and/or agents (or simply "objects"). In some embodiments, the node meta model describes any system, device, object, or framework by way of its respective capabilities, properties, events, methods of communication, etc., such that an agent or client can understand, at run-time, how to accurately integrate and/or communicate with the aforementioned system, device, object, or framework, and to do so with no development effort. In some embodiments, the node meta model describes all communicable disparate objects, including both physical objects and virtual objects. In some embodiments, the disparate objects described by the node meta model include objects deployed as inter-networked objects of the IoT and objects deployed as connected objects without inter-connection to other IoT objects and, therefore, not designated as IoT objects.

Some embodiments include a meta-model object communication and node definition system. In some embodiments, the meta-model object communication and node definition system defines and provisions objects in a neutral definition language and supports object communication by way of the neutral definition language. In some embodiments, the meta-model object communication and node definition system comprises an embedded meta-model object communication and node definition system.

Some embodiments include object node provisioning processes for provisioning nodes for objects defined by a neutral definition language of a node meta-model. The object node provisioning processes of some embodiments provision a node by direct object request.

In some embodiments, the object node provisioning processes include an embedded object node provisioning process for provisioning a node for an object defined by a neutral definition language of a node meta-model. In some embodiments, the embedded object node provisioning process provisions a node for an object by direct object request. In some embodiments, the embedded object node provisioning process includes (i) requesting approval to provision an object directly from the object, (ii) requesting an object definition directly from the object, (iii) requesting an editor for object definition directly from the object, (iv) determining whether the object supports a native language, (v) requesting the native language for object definition directly from the object when the object supports the native language, and (vi) provisioning the object.

Some embodiments include a plurality of embedded node meta-model runtime processes for interacting with and operating provisioned objects of an embedded meta-model object communication and node definition system.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 10 conceptually illustrates an electronic system with which some embodiments of the invention are implemented.

DETAILED DESCRIPTION

Figure 1:
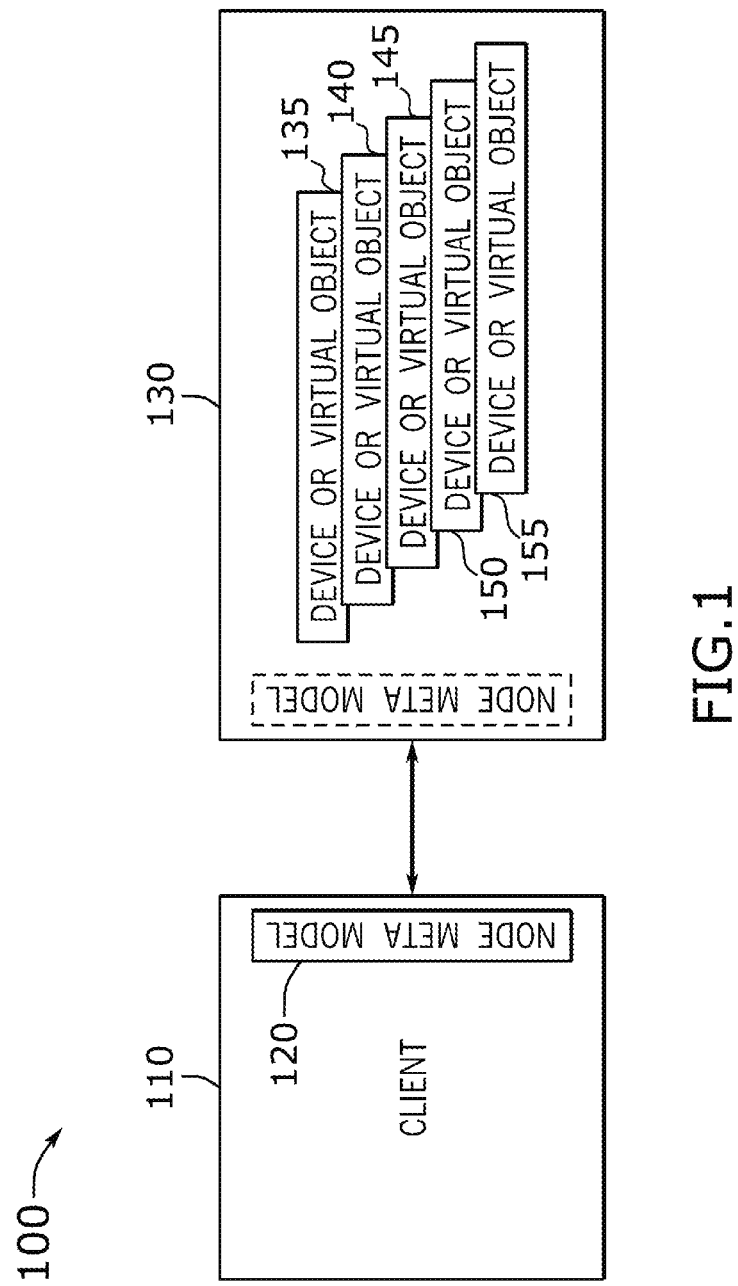
FIG. 1 conceptually illustrates a block diagram of an embedded meta-model object communication and node definition system in some embodiments.

In the following detailed description of the invention, numerous details, examples, and embodiments of object node provisioning processes for provisioning objects and communicating with provisioned objects in a meta-model object communication and node definition system that creates—without a priori knowledge of the types of devices, their capabilities, accepted commands/events, and underlying frameworks, and without expending any development effort—a node meta model that provides a seamless and run-time integration/binding between disparate devices, frameworks, and/or agents are described. However, it will be clear and apparent to one skilled in the art that the processes for provisioning objects and communicating with provisioned objects in the meta-model object communication and node definition system are not limited to the embodiments set forth because the node meta model, while utilizing IoT as a baseline to provide meaningful and tangible benefits, is based on a neutral definition language that describes the capabilities, properties, and events of disparate physical and virtual objects, such as devices, systems, frameworks, virtual objects, and other connected objects or things, which may be adapted for use in beyond IoT and for describing any other type of object where seamless communication may provide enhanced benefits of the object.

In this specification, there are several descriptions of methods and processes that are implemented as software applications or computer programs which run on electronic devices, mobile devices, computers, etc., (or simply, "computing devices") to perform the steps of the methods and/or processes. However, it should be noted that for the purposes of the embodiments described in this specification, the word "method" is used interchangeably with the word "process". Processes or methods for provisioning a node for an object defined by a neutral definition language of a node meta-model and for interacting with objects in the world based on descriptions of nodes provisioned in a node meta-model are described, therefore, by reference to example methods that conceptually illustrate steps of methods for provisioning a node for an object defined by a neutral definition language of a node meta-model and for interacting with objects in the world based on descriptions of nodes provisioned in a node meta-model.

As stated above, one of the problems with the present unworkable options in the ever increasing and ubiquitous IoT is that when it comes to individual devices and frameworks, different standards and frameworks are in place which require development time and significant knowledge of each IoT standard or framework for each type of device. Thus, it is becoming increasingly difficult to create a seamless and run-time integration/binding between disparate devices, frameworks, and agents without a priori knowledge of the type of devices, their capabilities, accepted commands/events, and underlying frameworks. Embodiments of the invention described in this specification solve such problems by a meta-model object communication and node definition system that creates a node meta model (hereinafter referred to interchangeably as "node meta model" or by the acronym "NMM") which provides a seamless and run-time integration/binding between disparate devices, systems, frameworks, objects, and/or agents. In some embodiments, the meta-model object communication and node definition system defines and provisions nodes in the NMM for real world objects, defining the nodes in a neutral definition language and supporting object communication by way of the neutral definition language.

In some embodiments, the NMM describes any system, device, or framework by way of its respective capabilities, properties, events, methods of communication, etc., such that an agent or client can understand, at run-time, how to accurately integrate and/or communicate with the aforementioned system, device, or framework, and to do so with no development effort. In other words, the NMM enables agents to understand, accurately represent, and be able to immediately communicate with those objects and things at run-time and regardless of whether there is any knowledge of how to communicate with the objects and things in advance and without even knowing their explicit type. In this respect, then, no longer is there a need for agent manufacturers to develop drivers at development time while being able to communicate, command, and control a limitless number of things seamlessly and immediately at run-time. Furthermore, the NMM describes all communicable disparate objects, including both physical objects and virtual objects. In some embodiments, the disparate objects described by the NMM include objects deployed as inter-networked objects of the IoT and objects deployed as connected objects without inter-connection to other IoT objects and, therefore, not designated as IoT objects.

In some embodiments, the meta-model object communication and node definition system is an embedded meta-model object communication and node definition system. By way of example, FIG. 1 conceptually illustrates a block diagram of an embedded meta-model object communication and node definition system 100. As shown in this figure, the embedded meta-model object communication and node definition system 100 includes a client computing device 110, a node meta-model 120, and a controlled object grouping 130 of a plurality of controlled objects 135-155 that are defined by a neutral definition language of the node-meta-model 120. Each controlled object in the plurality of controlled objects 135-155 comprises one of a controlled device and a virtual object. The node meta-model 120 describes capabilities, properties, and events of the controlled objects 135-155 in the neutral definition language.

The client computing device 110 uses the node meta-model 120 to communicate with and receive communications from the controlled objects 135-155. Since the node meta-model 120 defines the controlled objects 135-155 in the neutral definition language, the client computing device 110 can communicate with any of the controlled objects 135-155 regardless of any native control language inherently used by any of the controlled objects 135-155.

Several more detailed embodiments are described in the sections below. Section I describes embedded node meta-model object provisioning by way of an embedded object node provisioning process and an embedded meta-model object communication and node definition system with several provisioned nodes of physical and virtual objects. Section II describes runtime processes for utilizing a node meta-model of an embedded meta-model object communication and node definition system. Section III describes an electronic system that implements some embodiments of object node provisioning processes and meta-model object communication and node definition systems.

I. Embedded Node Meta-Model Object Provisioning

In some embodiments, the object node provisioning processes are performed by agents or devices of the meta-model object communication and node definition system. In some embodiments, the object node provisioning processes provision a node by direct object request. In some embodiments, the object node provisioning processes include an embedded object node provisioning process for provisioning a node for an object defined by a neutral definition language of a node meta-model. In some embodiments, the embedded object node provisioning process provisions a node for an object by direct object request. In some embodiments, the embedded object node provisioning process includes (i) requesting approval to provision an object directly from the object, (ii) requesting an object definition directly from the object, (iii) requesting an editor for object definition directly from the object, (iv) determining whether the object supports a native language, (v) requesting the native language for object definition directly from the object when the object supports the native language, and (vi) provisioning the object.

Figure 2:
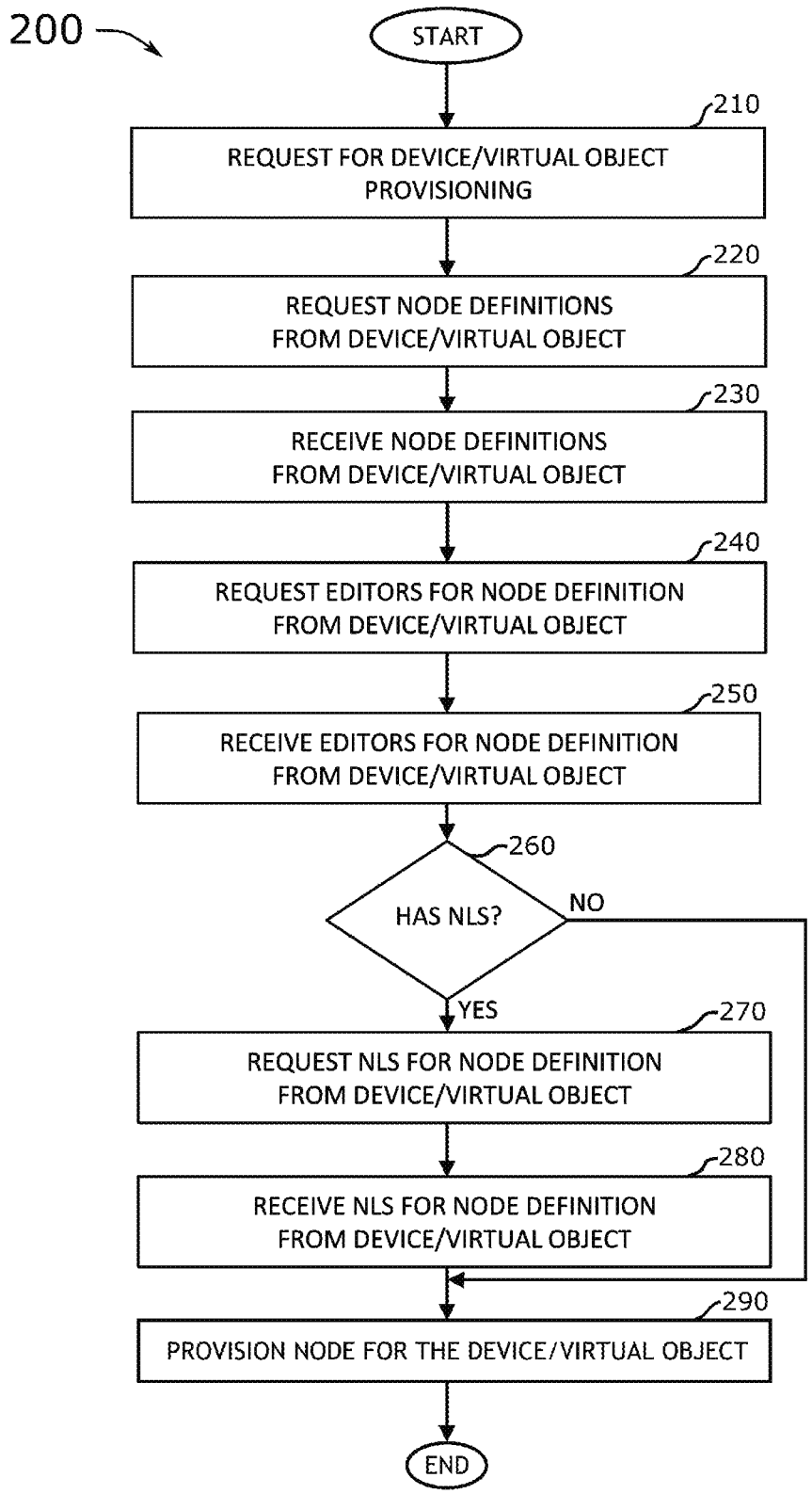
FIG. 2 conceptually illustrates an embedded object node provisioning process for provisioning a node for an object defined by a neutral definition language of a node meta-model in some embodiments.

By way of example, FIG. 2 conceptually illustrates an embedded object node provisioning process 200 for provisioning a node for an object defined by a neutral definition language of a node meta-model. As shown in this figure, the embedded object node provisioning process 200 starts upon receiving (at 210) a request for provisioning of an object. The object is either a physical device, such as a furnace or a light, or a virtual object, such as an identifiable security (e.g., stock, bond, etc.). Next, the embedded object node provisioning process 200 requests (at 220) node definitions from the object.

In some embodiments, the embedded object node provisioning process 200 receives (at 230) the node definitions from the object. The embedded object node provisioning process 200 of some embodiments then requests (at 240) editors for node definition from the object. Next, the embedded object node provisioning process 200 receives (at 250) editors for node definition from the object.

In some embodiments, the embedded object node provisioning process 200 determines (at 260) whether the object has national language support (hereinafter referred to by its acronym "NLS"). In some embodiments, NLS provides easy translation of human readable information, such as commands, controls, statuses, etc., in different languages. In this way, a node definition can include NLS information such that clients (or agents), such as client computing device 110, can present the same information differently depending on a locale or based on some other factor or consideration. When the embedded object node provisioning process 200 negatively determines (at 260) that the object does not have NLS, then the embedded object node provisioning process 200 provisions (at 290) the node for the object. After provisioning the node (without NLS), the embedded object node provisioning process 200 ends.

On the other hand, when the embedded object node provisioning process 200 affirmatively determines (at 260) that the object does have NLS, then the embedded object node provisioning process 200 requests (at 270) NLS for node definition from the object. Next, the object node provisioning process 200 receives (at 280) NLS for node definition from the object. In some embodiments, the embedded object node provisioning process 200 then provisions (at 290) the node for the object. After provisioning the node (with NLS), the embedded object node provisioning process 200 ends.

The embodiments described in this specification differ from and improve upon currently existing options. In particular, all of the existing IoT standards and frameworks are type based, which means that consumers of IoT services must have a priori knowledge of the type of object or thing with which to communicate. The amount of different types of objects or things is countless. Examples of common types of object or things that are based on existing IoT standards and frameworks include, without limitation, lights, sensors, door locks, thermostats, etc. To actually benefit from the objects and things that adhere to their specific IoT standards or frameworks, one must understand the type of object or thing, have knowledge of its properties, and understand its behaviors at development time. Each new type of object or thing, or any variations of existing objects or things, requires further development with a priori knowledge as noted above so that one can develop drivers or firmware that is capable of communicating with the objects/things.

Embodiments of the embedded meta-model object communication and node definition system include a node meta model (NMM) with node definitions of provisioned nodes describing objects or things in the world. In some embodiments, the embedded meta-model object communication and node definition system includes a plurality of NMMs. Each NMM may include several elements that serve one or more descriptive purposes for the embedded meta-model object communication and node definition system to function in relation to objects or things in the world. In the following NMM example, several elements describe status values and commands of a provisioned node that corresponds to an audio device object in the world. The several elements in the example NMM are intended to be exemplary only and it is not intended that these elements be used to limit any NMM or the manner of defining any such NMM, or to limit the functionality of the embedded meta-model object communication and node definition system of the present application to just these elements in relation to just the audio device object. Persons having ordinary skill in the art relevant to the present disclosure may understand there to be equivalent elements that may be substituted within the example NMM or within other NMMs to provide descriptions of provisioned nodes such that the embedded meta-model object communication and node definition system is able to function in relation to the objects or things in the world corresponding to the provisioned nodes.

1. Node Meta Model (NMM) which is an abstraction of objects or things in the world. Just like in real life, objects/things have attributes, methods, and can perform actions on other objects or things. The objects/things are nodes in the NMM with methods and attributes for who does what to whom (thematic relationship). A basic description of an NMM may include one or more definitions of provisioned nodes:

```
<nodeDefs>
    <nodeDef id="1">
    </nodeDef>
    ...
</nodeDefs>
```

2. Node represents all of, or a subset of, a physical device such as a lamp, a switch, a keypad, an audio output device, a smoke detector, a furnace, etc., or a conceptual device (or "virtual" device) such as weather information, event alerts, stock quotes or other financial instruments, etc.

3. Node Definition is used to describe a node and includes a list of status values for properties it maintains (e.g., the current temperature, hot/cold set points for a thermostat; a volume setting for an audio output device; etc.), the list of commands it accepts (e.g., on/off for a dimmer lamp, volume increase/decrease for an audio output device, etc.), and a list of the commands it may send out (e.g., on/off for a dimmer switch, etc.), if any. Property status values and commands of a node are described further below. However, the following example node definition demonstrates how the NMM uniquely identifies provisioned nodes and accounts for other features of the node which are not properties or commands (i.e., this node includes support for NLS):

```
<nodeDefs>
    <nodeDef id="audiodevice" nls="audio-talk">
    </nodeDef>
    ...
</nodeDefs>
```

4. Unit of Measure (UOM) allows an agent or client without a priori knowledge of specific property values to figure out the values at run-time. UOMs are typically static in nature which allows run-time discovery/binding/communications with objects and things. Furthermore, UOMs allow for normalization of values and/or conversion of values such as Celsius to Fahrenheit. An example of UOM is described in relation to editors, next.

5. Editors define parameters and constraints for a widget in the client or agent, such as combo-boxes, numeric fields, etc., and define permissible values and the UOMs available, as well as permissible ranges of entries, each of which has a unique UOM. Each object or thing can present its own set of editors during the run-time discovery/binding process. The following example definitions of editors include UOM settings and range settings:

```
<editors>
    <editor id="svolume">
        <range uom="5" min="0" max="11" />
    </editor>
    ...
</editors>
```

6. National Language Support (NLS) allows for easy translation of human readable information (e.g., commands, controls, statuses, etc.) in different languages. In short, node definitions can include NLS information such that the agents/clients can present the same information differently depending on the locale (or other considerations). The example node definition provided in relation to #3 Node Definition included NLS support (e.g., "audio-talk"):

```
<nodeDef id="audiodevice" nls="audio-talk">
```

7. Commands describe the actions that can be done to a node or the actions that a node can do to the other nodes including. Commands may manipulate properties (e.g., volume of audio, hot set point, cold set point, etc.), may be completely unrelated to properties (e.g., play, pause, charge, discharge, etc.), and events that nodes send back to the clients and which might not be the same as the status of a property (button pressed, motion sensed, etc.). The following example node definition includes a command for adjusting a volume property and commands for play and pause which are unrelated to node definition properties:

```
<nodeDef id="audiodevice" nls="audio-talk">
    <cmds>
        <sends/>
        <accepts>
            <cmd id="VOLUME">
                <p id=" " editor="svolume" init="ST" />
            </cmd>
            <cmd id="PLAY" />
            <cmd id="PAUSE" />
        </accepts>
    </cmds>
</nodeDef>
```

8. Properties are intrinsic characteristics of a device or of a conceptual thing or object (node). Properties have values that are defined by UOM, represented and constrained by editors and NLS, and manipulated by commands. At a high level, all properties can be of generic type, the point being that a run time binding does not depend on a priori knowledge of properties. The following example node definition includes a property for volume (which can be set via the "VOLUME" command described in the example above):

```
<nodeDef id="audiodevice" nls="audio-talk">
    <sts>
        <st id="ST" editor="svolume" />
    </sts>
    <cmds>
        <accepts>
            <cmd id="VOLUME">
                <p id=" " editor="svolume" init="ST" />
            </cmd>
            ...
        </accepts>
    </cmds>
</nodeDef>
```

9. Translator is an optional agent which can optionally translate between frameworks/standards. For integration purposes, for example, a translator might be used to consume information from a different standard/framework interface and make all the nodes and their properties/capabilities available as node definitions for others to consume.

10. Repository is an optional agent which allows node definitions to be retrieved at run-time in case a node does not provide it itself.

Figure 3:
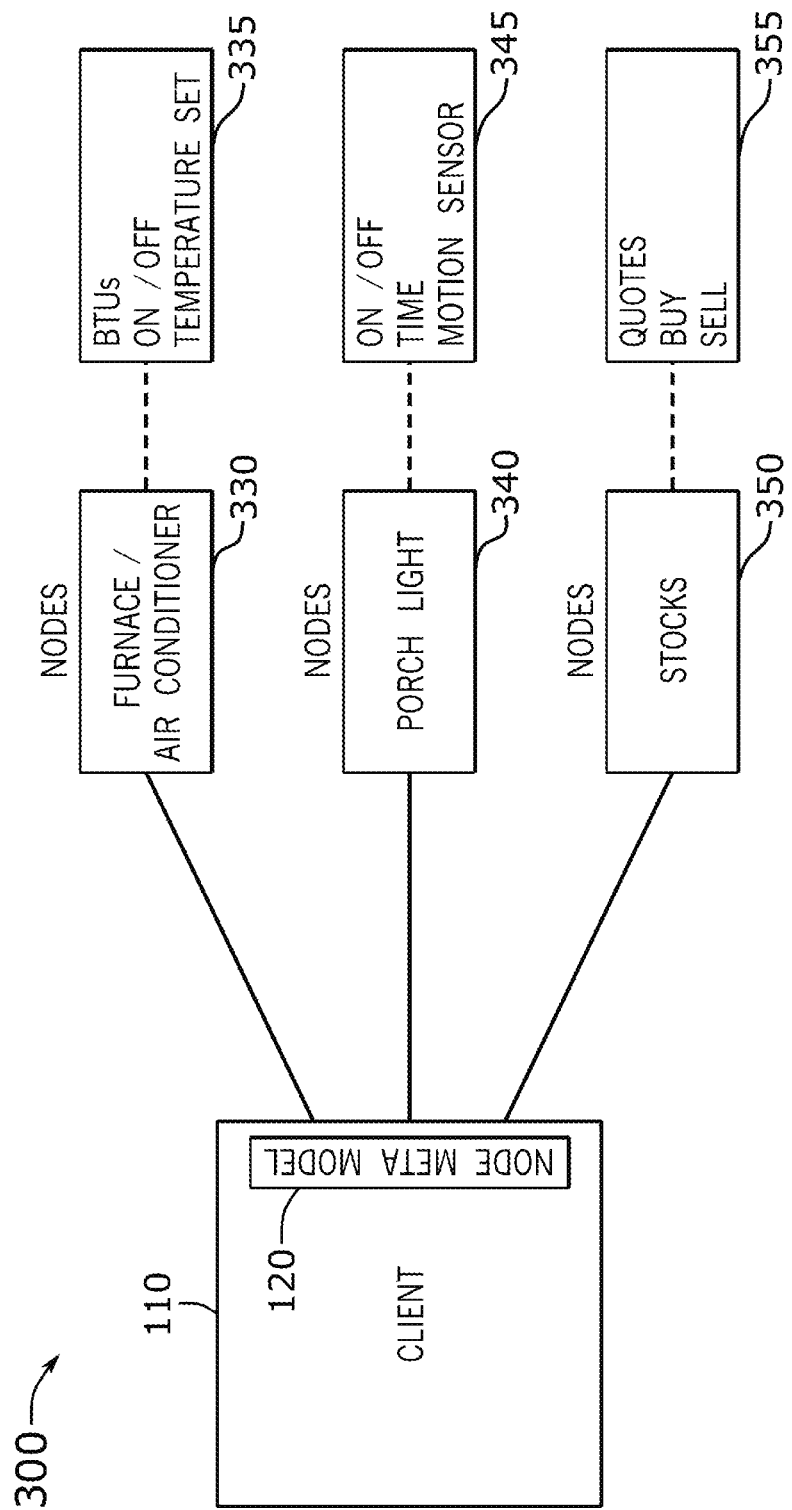
FIG. 3 conceptually illustrates a block diagram of an embedded meta-model object communication and node definition system with several provisioned nodes for several example devices and virtual objects in some embodiments.

Turning to another example, FIG. 3 conceptually illustrates a block diagram of an embedded meta-model object communication and node definition system 300 with several provisioned nodes for several example devices and virtual objects. As shown in this figure, the embedded meta-model object communication and node definition system 300 includes the client computing device 110, the node meta-model 120, and a plurality of nodes including a furnace/air conditioner node 330, a porch light node 340, and stocks node 350. Each node is associated with a node definition. Thus, the furnace/air conditioner node 330 is associated with node definition 335 that describes a unit of measure (UOM) of BTUs for the furnace/air conditioner object node 330. The porch light node 340 is associated with node definition 345, which describes on/off send or receive commands, time (until an automatic shut-off), and motion sensor, all related to the porch light object node 340. The stocks node 350 is associated with node definition 355, which includes quotes, buy commands, and sell commands. All nodes 330-355 are defined by the neutral definition language of the node-meta-model 120. Thus, the node meta-model 120 describes capabilities, properties, and events of the objects provisioned as nodes 330-355.

The client computing device 110 uses the node meta-model 120 to communicate with and receive communications from the objects defined by nodes 330-355. For example, the client computing device 110 can utilize the node meta-model 120 to set the temperature of the furnace object define by the furnace/air conditioner node 330, or could request the porch light time setting (i.e., the amount of time the porch light remains on after the sensor is triggered), and if determined to be insufficient, reset the time setting to a different value. Similarly, the client computing device 110 could request current stock quotes and send commands to sell or buy stocks, based on the stocks node 350 definition of the virtual financial instrument.

The client computing device 110 can be any type of computing or electronic device that is capable of electronically communicating with defined objects of the NMM in the neutral definition language of the NMM. Thus, the client computing device 110 may be a mobile (or hand-held) device that was developed and manufactured with no prior knowledge of how to communicate with a particular type of porch light a person may have at their home, or how to communicate with various financial instruments, etc.

The emphasis on eliminating the need for a priori knowledge and development effort cannot be understated because the existing options simply do not provide a runtime binding in any manner. Abstracted meta models either do not exist or are not defined at the right level of abstraction to be able to engage in real-time communication. Therefore, definitions must be created for all objects or things (and all of their variations), which perpetuates the need for significant a priori knowledge and time to develop communication modules, drivers, etc., for any other system, framework, object, device, etc.

Furthermore, many of the existing objects or things are described in ambiguous vernacular, which is confusing at best, and at worst, do not even represent the reality of the thing. Many existing options present immutable characteristics which could alternatively be optionally defined at runtime. Color is an example of a characteristic which most existing options treat as an immutable object rather than as a property/characteristic of an object or thing (e.g., an adjective of the thing). Many more such qualities are treated differently across the IoT ecosystem. For instance, services or behaviors (e.g., verbs) are confused with properties of things: play, stop, pause, next, up, down, charge, discharge, etc. In contrast, the NMM introduces a neutral definition language which can describe any device, standard, and/or framework and provide run-time bindings/integrations between each.

In addition, these embodiments improve upon the currently existing options because although these devices/systems work very well in their own silos/frameworks, they cannot integrate with other devices/systems without major development effort. However, the processes for provisioning objects and communicating with provisioned objects in a meta-model object communication and node definition system described in this disclosure enables integration between different systems, devices, and frameworks at run-time by describing each in the NMM using a neutral definition language. Each system, device, and framework is described using its capabilities, properties, events, and methods of communication which ultimately enables an agent or client device to understand at run-time how to accurately integrate/communicate with these systems without any development effort.

The meta-model object communication and node definition system of the present disclosure generally works by categorizing things or objects as nodes. A node definition is used to describe a node. The node definition includes status values for its properties of the object or thing, as well as commands, which may be subdivided by commands that the object or thing accepts as valid commands (e.g., on/off on a dimmer lamp) and commands that the object or thing may send out (e.g., on/off on a dimmer switch connected to a dimmer lamp).

However, in order to enable run-time binding between objects and things, three aspects beyond merely having node definitions to define nodes of objects or things are introduced, including unit of measure (UOM), editors, and NLS.

A unit of measure (UOM) allows an agent or client without a priori knowledge of property values of objects or things to work with the meta-model object communication and node definition system across a variety of disparate objects or things. UOMs are static in nature which allows for run-time discovery/binding/communications with an object or a thing. Furthermore, UOMs allow for normalization of values and/or conversion of values such a conversion of values from Celsius to Fahrenheit. When there is no UOM available that handles a specific need (e.g., a value conversion, normalization of values, etc.), it is possible in some embodiments to construct a UOM at run-time from a combination of an index, an editor, and NLS.

An editor defines the parameters and constraints for a widget in the client or agent, such as combo-boxes, numeric fields, etc., and define permissible values and the unit(s) of measure available. An editor may include permissible ranges of entries, each of which has a unique UOM. In this respect, then, an editor separates presentation and constraints from the actual inherent properties and, therefore, enables re-use of properties (although not necessary) without having to define multiple versions of the same property with different constraints. Furthermore, editors need not be global or predefined. Each object or thing can present its own set of editors during the run-time discovery/binding process.

National Language Support (NLS) allows for easy translation of human readable information (e.g., commands, controls, statuses, etc.) in different languages. Node definitions can include NLS information such that the agents/clients can present the same information differently depending on the locale (or other considerations). NLS is especially important for enumerated values. Optionally, NLS may include icons.

Commands and properties in a device/system can be defined in an agnostic manner when there are one or more editor(s), a UOM, and NLS. Specifically, commands describe actions that can be done to a node or action that a node can do to other nodes. Commands are defined generically and do not impact the run-time binding. Commands may manipulate properties or may be completely unrelated (e.g., play, pause, charge, discharge, etc.). Commands also represent events that nodes send back to the clients and which might not be the same as the status of a property.

Properties are intrinsic characteristics of a device, an object, or a conceptual thing which we thus refer to as node. Properties have values that are defined by UOMs, represented and constrained by editors and NLS, and manipulated by commands. At a high level, all properties can be of a generic type. In this way, the run-time binding does not depend on a priori knowledge of properties.

Thus, as described above, the node meta-model is an abstraction of real objects and things in the world. The objects and things have intrinsic attributes or characteristics, many of which may take one or more of several values in a range of values or may take a single value in a binary value range. The objects and things may further have methods that relate to services that the objects or things provide or to commands for interacting with the objects or things. The objects and things defined as nodes in a node meta-model may even perform actions on other objects or things.

To make the meta-model object communication and node definition system of the present disclosure, a node meta-model (NMM) may be designed and deployed in a way that agents or clients can produce node definitions of objects or things in the actual world to include in the NMM as nodes. Agents and clients may also consume node definitions from the NMM in order to understand associated real world objects or things. The NMM is a neutral definition language model, therefore, node definitions may be expressed in any type of meta definition language such as XML, JSON, SGML, and even text. Producers create node definitions for objects or virtual objects and would have their respective UOM, editors, and NLS, as well as commands and properties for each node or virtual node they represent. Consumers of node definitions retrieve the node definitions from the producers, parse the node definitions at run-time, and make the node commands, properties, and events available to their agents in an accurate manner using the provided UOM, editors, and NLS. Therefore, the next section describes several run-time (or "runtime") processes for performing actions on objects or things defined by nodes of a node meta-model or for receiving information from objects or things.

II. Embedded Node Meta-Model Runtime Processes

Several embedded node meta-model runtime processes are described in this section. Unlike the embedded object node provisioning process 200 described above by reference to FIG. 2, the embedded node meta-model runtime processes pertain to methods of acting on objects or things, receiving information from objects or things, or on inter-object operations from an originating object or thing which acts on, or sends information to, a receiving object or thing. As any node meta-model definition is capable of describing nodes for an unlimited number of objects or things in the real world, the following embedded node meta-model runtime processes are presented as example processes and are not to be construed as being limited to only these embedded node meta-model runtime processes.

Figure 4:
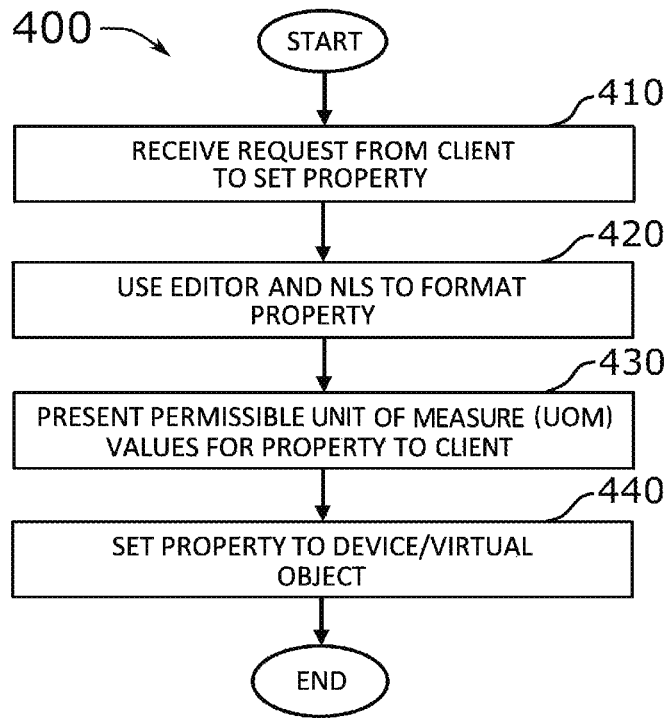
FIG. 4 conceptually illustrates an embedded node meta-model runtime process for setting a property of an object defined in a node meta-model by a node definition for the object in some embodiments.

By way of example, FIG. 4 conceptually illustrates an embedded node meta-model runtime process for setting a property of an object 400 defined in a node meta-model by a node definition for the object. The embedded node meta-model runtime process for setting a property of an object 400 may be performed by a client computing device or agent device (referred to in the embedded node meta-model runtime process examples in this section as a "client"), such as client computing device 110, described above by reference to FIGS. 1 and 3. The client may include a computer program that utilizes a node meta-model to interact with an object or thing defined by a node definition in the node meta-model. The computer program can be any kind of program capable of carry out instructions on a processor of the client that relate to the steps of the embedded node meta-model runtime process for setting a property of an object 400. Thus, the client may include an embedded computer program that runs silently on the client, a service that automatically runs on the client, or as a desktop software application that takes direction from a user or an agent (e.g., an artificial intelligence (AI) agent) interacting with the software application by way of a user interface (UI) or an application programming interface (API).

As shown in this figure, the embedded node meta-model runtime process for setting a property of an object 400 starts by receiving (at 410) a request to set a property from the client. The request is received after a target device, object, or virtual object has already been provisioned (and possibly after operational deployment of the device, object, or virtual object). As such, the request is considered to be received at runtime. The embedded node meta-model runtime process for setting a property of an object 400 then uses an editor and NLS associated with the property to format the property (at 420). Again, the formatting of the property occurs at runtime.

Next, the embedded node meta-model runtime process for setting a property of an object 400 of some embodiments presents (at runtime and to the client) permissible values of the property (at 430). Permissible values of the property may have been defined entirely, or in part, while provisioning the device, object, or virtual object. For instance, the node definition of a provisioned "object" may define several properties with each property corresponding to a set of defined values which are permissible for the property to which the set of defined values correspond. If multiple permissible values are defined for a property, then it may be possible at runtime (after the object is provisioned and deployed) to change the value of the property of the object. For example, a morning wake light may include a property for how long the light should take to go from no light to a maximum amount of light (e.g., gradually increasing the amount of light over a 5 minute duration of time, or over a 10 minute duration of time, or a longer/shorter duration of time). Thus, in some embodiments, the embedded node meta-model runtime process for setting a property of an object 400 presents options for setting properties according to the permissible values that are described in the node definition related to the object whose property is presently being set.

To identify permissible values of a property, the editor definition associated with the property may be searched to find and retrieve the permissible values of the property. In some embodiments, the permissible values are defined in the editor definition according to a unit of measure (UOM) for the property being set. The UOM may be defined in a way that permits unlimited values (e.g., a stock price widget that notifies the client when the stock price reaches some price set by the client from an unlimited range of prices that increase from a bounded lowest price, such as $0), or may be limited to a smaller range of values (e.g., a binary pair of values, such as ON/OFF, UP/DOWN, LEFT/RIGHT, 0/1, etc., a set of values defined in a mathematical notation, such as 8-bit color depth comprising 256 colors within a given color space, etc.), or simply a single value in some cases.

After presenting the permissible values to the client, the embedded node meta-model runtime process for setting a property of an object 400 of some embodiments takes the value selected by the client and sets the property (at 440) of the device/virtual object to the selected value. Then the embedded node meta-model runtime process for setting a property of an object 400 ends.

Figure 5:
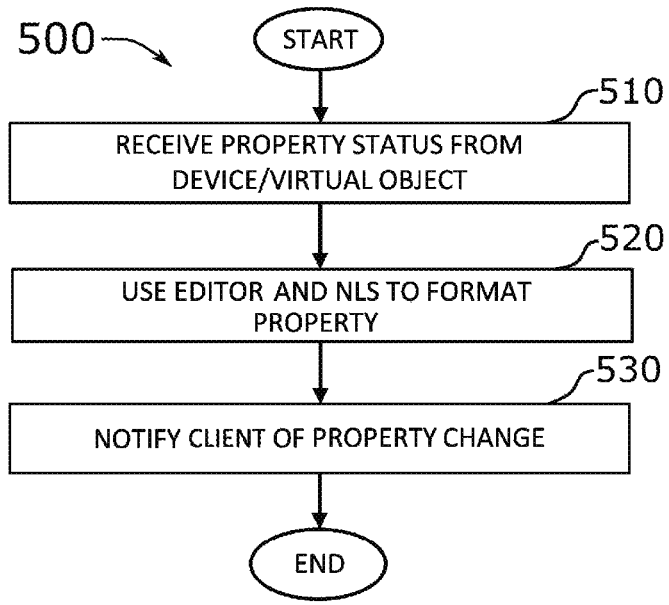
FIG. 5 conceptually illustrates an embedded node meta-model runtime process for notifying a client of a property change of an object defined by a node definition of a node meta-model in some embodiments.

Now turning to another example embedded node meta-model runtime process, FIG. 5 conceptually illustrates an embedded node meta-model runtime process for notifying a client of a property change of an object 500 defined by a node definition of a node meta-model. The embedded node meta-model runtime process for notifying a client of a property change of an object 500 may be performed by the client. The client may include an embedded node meta-model which a computer program on the client utilizes in connection with information it receives from objects or things defined in the node meta-model. The computer program can be any kind of program capable of carry out instructions on a processor of the client that relate to the steps of the embedded node meta-model runtime process for notifying a client of a property change of an object 500. Thus, the client may include an embedded computer program that runs silently on the client listening for the occurrence of events related to objects or things defined in the node meta-model, or other computer programs as noted above. Also, the operations of the embedded node meta-model runtime process for notifying a client of a property change of an object 500 are performed at runtime, after the device, object, or virtual object associated with the property change has been provisioned and deployed.

As shown in this figure, the process for notifying a client of a property change of an object 500 starts by receiving (at 510) a property status from an object defined in the node meta-model, such as a device or a virtual object. In some embodiments, the client receives notifications from objects defined in the NMM when a change in value occurs or when a value condition is met (e.g., a stock price falls to a predefined price at which time a stock price widget automatically notifies the client, or the temperature of ambient air in a room drops to a particular temperature at which a climate control system is automatically notified to increase temperature, etc.).

In some embodiments, the process for notifying a client of a property change of an object 500 then uses an editor and NLS to format the property (at 520). Next, the process for notifying a client of a property change of an object 500 notifies (at 530) the client of the property change. Then the process for notifying a client of a property change of an object 500 ends.

Figure 6:
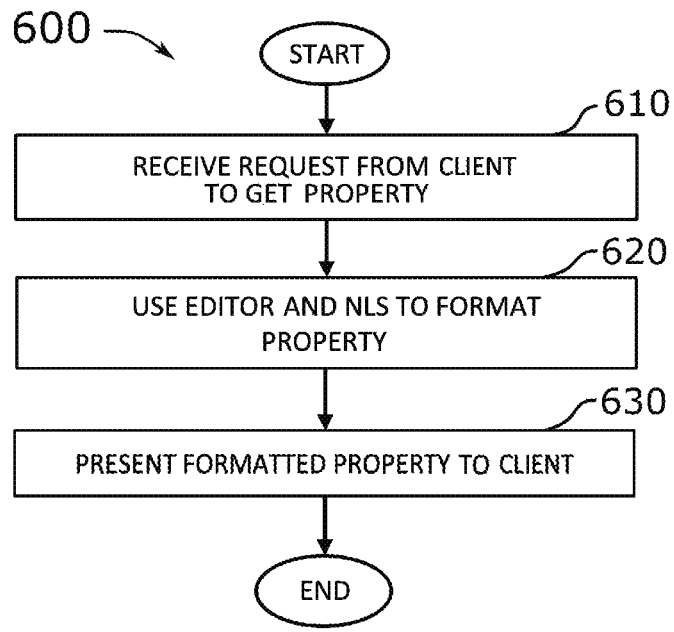
FIG. 6 conceptually illustrates an embedded node meta-model runtime process for retrieving a formatted property of a node of an embedded meta-model object communication and node definition system in some embodiments.

In many cases, an individual property of a device, object, virtual object, etc., is requested by the client. In some of these cases, the client takes subsequent action based on the property value or status, such as setting a new value for the property, or using the property value as information for something else. An example of getting a property of a device, a physical object, or a virtual object is described next by reference to FIG. 6, which conceptually illustrates an embedded node meta-model runtime process for retrieving a formatted property of a node 600 of an embedded meta-model object communication and node definition system. The embedded node meta-model runtime process for retrieving a formatted property of a node 600 may be performed by a computer program running on the client or running in connection with the client. The operations of the embedded node meta-model runtime process for retrieving a formatted property of a node 600 are performed at runtime, after object provisioning is completed for a device, object, or virtual object to which the targeted property corresponds.

As shown in this figure, the embedded node meta-model runtime process for retrieving a formatted property of a node 600 begins by receiving (at 610) a request from the client to get a property of a device, an object, or a virtual object. Next, the embedded node meta-model runtime process for retrieving a formatted property of a node 600 utilizes (at 620) an editor associated with the property and NLS to format the property. In some embodiments, the embedded node meta-model runtime process for retrieving a formatted property of a node 600 then presents (at 630) the formatted property to the client. Once the formatted property is made available, the client can decide whether to change a value of the property, or use the property value in some other way. Then the embedded node meta-model runtime process for retrieving a formatted property of a node 600 ends.

Sometimes a client or agent intends to direct the device, the object, or the virtual object to act according to a command. Commands which a client or agent intends to issue in relation to a device, an object, or a virtual object should be within the scope of supported commands that the device, object, or virtual object accepts as valid commands. An example of a client commanding an object to do something is described by reference to FIG. 7, which conceptually illustrates an embedded node meta-model runtime process for sending a formatted command to a device/virtual object associated with a node 700 of an embedded meta-model object communication and node definition system. As noted in the examples above, the embedded node meta-model runtime process for sending a formatted command to a device/virtual object associated with a node 700 may be performed by a computer program running on the client or running in connection with the client. Also, the operations of the embedded node meta-model runtime process for sending a formatted command to a device/virtual object associated with a node 700 are performed at runtime, after object provisioning is completed for the targeted device, object, or virtual object.

Figure 7:
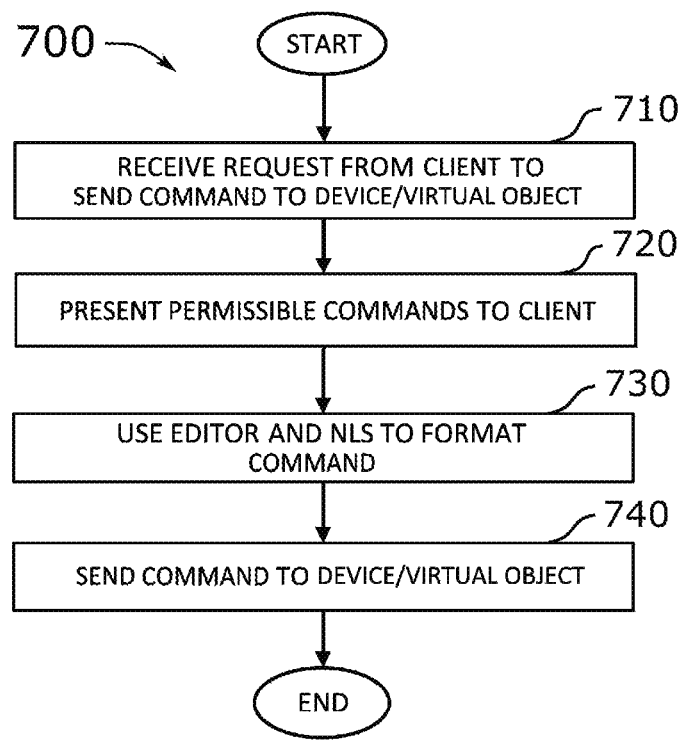
FIG. 7 conceptually illustrates an embedded node meta-model runtime process for sending a formatted command to a device/virtual object associated with a node of an embedded meta-model object communication and node definition system in some embodiments.

As shown in FIG. 7, the embedded node meta-model runtime process for sending a formatted command to a device/virtual object associated with a node 700 starts when it receives (at 710) a request from the client to send a command to the device/virtual object. Before sending the command, however, the embedded node meta-model runtime process for sending a formatted command to a device/virtual object associated with a node 700 presents (at 720) permissible commands to the client. As noted above, permissible commands for any given device, object, or virtual object are described in a node definition for the device, object, or virtual object in the node meta-model. The client may select one of the permissible commands or otherwise indicated a command to send to the device, object, or virtual object.

Next, the embedded node meta-model runtime process for sending a formatted command to a device/virtual object associated with a node 700 utilizes (at 730) an editor and NLS to format the command. Finally, the embedded node meta-model runtime process for sending a formatted command to a device/virtual object associated with a node 700 sends (at 740) the command to the device, object, or virtual object. After the command is sent, the embedded node meta-model runtime process for sending a formatted command to a device/virtual object associated with a node 700 ends.

Figure 8:
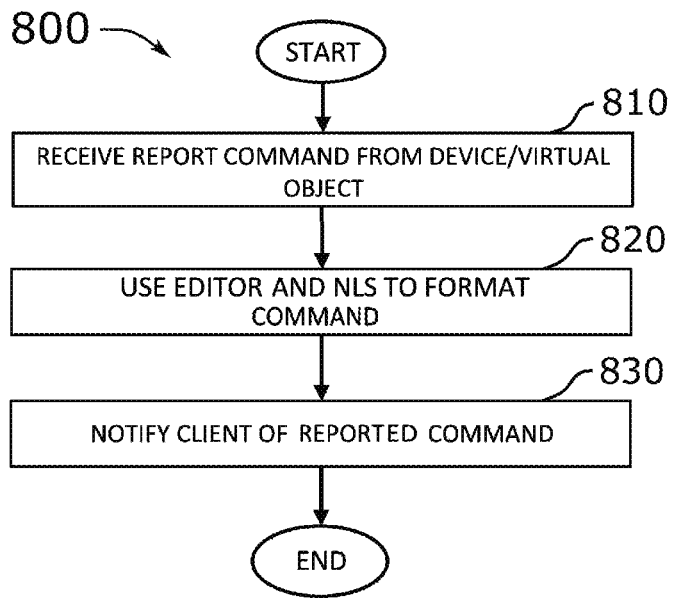
FIG. 8 conceptually illustrates an embedded node meta-model runtime process for receiving a command from a device/virtual object to report to a client of an embedded meta-model object communication and node definition system in some embodiments.

Turning now to another example, FIG. 8 conceptually illustrates an embedded node meta-model runtime process for receiving a command from a device/virtual object to report to a client 800 of an embedded meta-model object communication and node definition system. As above, the embedded node meta-model runtime process for receiving a command from a device/virtual object to report to a client 800 may be performed by a computer program running on the client or running in connection with the client and the operations of the embedded node meta-model runtime process for receiving a command from a device/virtual object to report to a client 800 are performed at runtime, after object provisioning is completed for the subject node.

As shown in this figure, the embedded node meta-model runtime process for receiving a command from a device/virtual object to report to a client 800 starts when it receives (at 810) a report command from the device/virtual object. In some embodiments, the embedded node meta-model runtime process for receiving a command from a device/virtual object to report to a client 800 then utilizes (at 820) an editor and NLS to format the reported command. In some embodiments, the embedded node meta-model runtime process for receiving a command from a device/virtual object to report to a client 800 then notifies (at 830) the client of the reported command. Then the embedded node meta-model runtime process for receiving a command from a device/virtual object to report to a client 800 ends.

Figure 9:
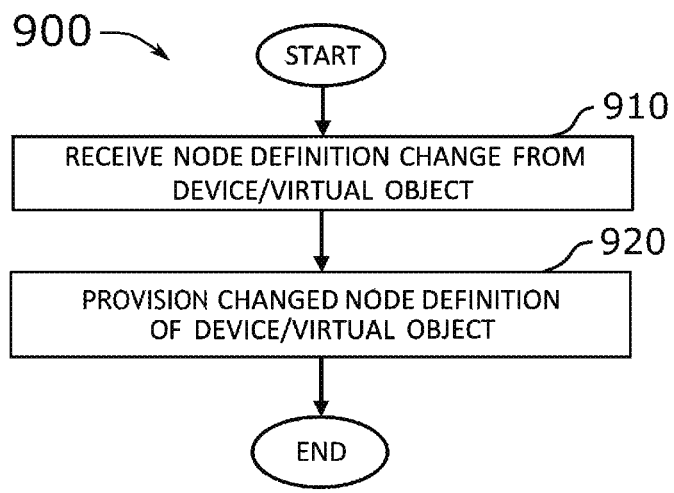
FIG. 9 conceptually illustrates an embedded node meta-model runtime process for changing a provisioned node of an embedded meta-model object communication and node definition system in some embodiments.

In yet another example runtime process, FIG. 9 conceptually illustrates an embedded node meta-model runtime process for changing a provisioned node 900 of an embedded meta-model object communication and node definition system. Once again, the embedded node meta-model runtime process for changing a provisioned node 900 may be performed by a computer program running on the client or running in connection with the client and the operations of the embedded node meta-model runtime process for changing a provisioned node 900 are performed at runtime, after object provisioning is completed for the subject node.

As shown in this figure, the embedded node meta-model runtime process for changing a provisioned node 900 starts by receiving (at 910) a node definition change from the device, object, or virtual object. In some embodiments, the embedded node meta-model runtime process for changing a provisioned node 900 transitions to the next step to provision (at 920) the changed node definition of the device, the object, or the virtual object. In some embodiments, when the embedded node meta-model runtime process for changing a provisioned node 900 provisions the changed node definition, the embedded node meta-model runtime process for changing a provisioned node 900 is technically re-provisioning a node in the NMM which is associated with the device, the object, or the virtual object.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 10 conceptually illustrates an electronic system 1000 with which some embodiments of the invention are implemented. The electronic system 1000 may be a computer, mobile device, tablet, phone, PDA, or any other sort of electronic device. Such an electronic system includes various types of computer readable media and interfaces for various other types of computer readable media. Electronic system 1000 includes a bus 1005, processing unit(s) 1010, a system memory 1015, a read-only 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only 1020, the system memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk or a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only 1020. For example, the various memory units include instructions for processing appearance alterations of displayable characters in accordance with some embodiments. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as cathode ray tubes (CRT) or liquid crystal displays (LCD). Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the drawings conceptually illustrate runtime or provision-time processes or methods, each with multiple steps. In each case, the specific operations of a process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a node meta-model object provisioning program which, when executed by a processor of a computing device, evaluates objects and provisions nodes for the objects in a node meta-model that describes the capabilities, properties, events, and methods of communication of the objects so that at least one of an agent and an object can communicate and interact with the objects without any prior knowledge of the objects, said node meta-model object provisioning program comprising sets of instructions for:

requesting, directly from an object comprising one of a device, a physical object, and a virtual object, approval to provision a node for the object in a node meta-model;

requesting, directly from the object, a definition of the object;

receiving the definition directly from the object, said definition including a parameter associated with a property the object maintains and a command associated with an action which when accepted by the object triggers the object to perform the action, wherein the property is associated with a plurality of property values over a range, wherein the definition is used in provisioning the node in the node meta-model as a node definition of the object, wherein the node definition includes a first status value associated with the property the object maintains and a second status value associated with the action triggered by the command;

requesting, directly from the object and based on the node definition, a plurality of editors comprising a first editor associated with the first status value and a second editor associated with the second status value, wherein the first editor is a setting tool to set the parameter associated with the property the object maintains, wherein the second editor is an issuing tool to issue the command associated with the action to trigger the object to perform the action;

receiving the plurality of editors from the object, wherein the first editor allows selection of a particular property value from the plurality of property values over the range, wherein the parameter associated with the property the object maintains is set to the particular property value in the node definition of the object when the particular property value is selected by way of the first editor;

determining whether the object includes national language support (NLS);

requesting NLS from the object when the object includes NLS;

receiving NLS from the object for node definition of the object in the node meta-model; and provisioning the node for the object in the node-meta model.

2. The non-transitory computer readable medium of claim 1, wherein the node meta-model object provisioning program further comprises a set of instructions for translating the node definition of the object using NLS.

3. The non-transitory computer readable medium of claim 2, wherein the node meta-model object provisioning program further comprises a set of instructions for translating the plurality of property values over the range using NLS, wherein the first editor sets the parameter associated with the property according to the NLS translation of the property value selected by a client from plurality of property values over the range for the object.

4. The non-transitory computer readable medium of claim 3, wherein NLS provides language information for easy translation of human readable information comprising one or more of commands, controls, and statuses in different languages, wherein the language information includes a set of language translations of the human readable information, wherein each language translation of the human readable information corresponds to a language used in a particular locale.

5. The non-transitory computer readable medium of claim 4, wherein the NLS information comprises replicated information in each of a plurality of languages that allow the client to present the same information differently depending on a locale in which the object is physically located.

* * * * *